(12) United States Patent
Ogawa

(10) Patent No.: US 8,137,876 B2
(45) Date of Patent: Mar. 20, 2012

(54) ELECTROPHOTOGRAPHIC PHOTORECEPTOR BELT

(75) Inventor: Noriyoshi Ogawa, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 304 days.

(21) Appl. No.: 12/310,363

(22) PCT Filed: Aug. 21, 2007

(86) PCT No.: PCT/JP2007/066147
§ 371 (c)(1),
(2), (4) Date: Aug. 28, 2009

(87) PCT Pub. No.: WO2008/023677
PCT Pub. Date: Feb. 28, 2008

(65) Prior Publication Data
US 2010/0015541 A1    Jan. 21, 2010

(30) Foreign Application Priority Data
Aug. 23, 2006 (JP) .................. 2006-226779

(51) Int. Cl.
*G03G 5/047* (2006.01)
(52) U.S. Cl. ......... 430/59.6; 430/56; 430/58.05; 430/66
(58) Field of Classification Search ............ 430/59.6, 430/66, 58.05, 56
See application file for complete search history.

(56) References Cited

FOREIGN PATENT DOCUMENTS

| | | |
|---|---|---|
| JP | 63-306459 | 12/1988 |
| JP | 2-207260 | 8/1990 |
| JP | 3-284757 | 12/1991 |
| JP | 6-75413 | 3/1994 |
| WO | WO 94/28458 | * 12/1994 |

OTHER PUBLICATIONS

International Search Report dated Sep. 18, 2007 in the International (PCT) Application PCT/JP2007/066147 of which the present application is the U.S. National Stage.

* cited by examiner

*Primary Examiner* — Peter Vajda
(74) *Attorney, Agent, or Firm* — Wenderoth, Lind & Ponack, L.L.P.

(57) ABSTRACT

An electrophotographic photoreceptor which is excellent in wear resistance and crack resistance and has a long photoreceptor lifetime can be produced by using a polycarbonate resin composition prepared by blending 100 parts by weight of a polycarbonate resin with 0.01 to 5 parts by weight of a silicone-modified polyurethane obtained by reacting (a) a diol component represented by the general formula (I) with (b) an active hydrogen containing polysiloxane compound, (c) a polyisocyanate component and, if necessary, (d) a chain extender as the material for the backing film of a photoreceptor belt. [Chemical formula 1](I) wherein $R_1$ and $R_2$ are each independently hydrogen or alkyl; $R_3$ is hydrogen, alkyl, alkoxy, halogeno or alkoxycarbonyl; M is a single bond, substituted or unsubstituted alkylene, or oxyalkylene; and n is an integer of 0 to 4.

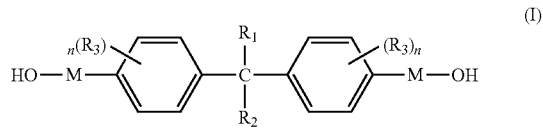

(I)

10 Claims, No Drawings

ELECTROPHOTOGRAPHIC PHOTORECEPTOR BELT

TECHNICAL FIELD

The present invention relates to an electrophotographic photoreceptor belt. More precisely, the present invention relates to an electrophotographic photoreceptor belt using a polycarbonate resin composition comprising specific silicone-modified polyurethane as a rear side reinforcing layer.

BACKGROUND ART

Currently, as a technology which enables with ease a high speed, miniaturization, and an increase in the size of copying machines and laser beam printers (hereinafter, "LBP"), an electrophotographic photoreceptor belt wherein the electrophotographic photoreceptor is formed in the shape of a belt has been developed.

The electrophotographic photoreceptor belt has an advantage that a metal drum having a large diameter as conventional photoreceptors is not required and a wider photoreceptor can be developed in the same volume. Therefore, it is suitable for downsizing of an equipment and high-speed printing of a large-sized print such as a poster.

The mainstream of an electrophotographic photoreceptor belt is that wherein a charge generating layer and a charge transport layer are formed on a conductive support belt substrate such as a film of stainless steel or an aluminum metallized polyethylene terephthalate. Among them, photoreceptor belts wherein polycarbonate is used for a charge transport layer are known. Among them, electrophotographic photoreceptor belts which are intended to prevent cracks and improve wear resistance after long-time repetitive use are known (see Patent Document 1, Patent Document 2 and Patent Document 3).

Currently, the demand of copying machines and LBPs overseas has been increased, and these machines are occasionally exposed to an unexpected use environment depending on the circumstances in each country. Especially, in the tropics, they are constantly exposed to an environment under high temperature and high humidity and are susceptible to a history where temperature and humidity are largely varied depending on on-off of an air conditioner in the room. In this case, the electrophotographic photoreceptor belt mounted in a copying machine or LBP tends to generate stress due to difference of linear expansion coefficient of the metal film side which does not cause hygroscopic expansion and the resin film part which readily cause hygroscopically expansion.

Therefore, occasionally, cracks or image failures generate on the surface of the belt in a shorter cycle than the expected number of service times, and thus improvement is required.

Meanwhile, for the purpose of preventing the curl of an electrophotographic photoreceptor belt, use of a belt-rear-side reinforcing film is known. While the rear side reinforcing film is effective for preventing the curl, it occasionally is insufficient in wear resistance of the reinforcing film or is insufficient in crack resistance of the electrophotographic photoreceptor belt exposed to an environment under high temperature and humidity, and thus improvement is required (see Patent Document 4).

Patent Document 1: Jpn. Pat. Laid-Open Publication No. H8-152723
Patent Document 2: Jpn. Pat. Laid-Open Publication No. H10-111579
Patent Document 3: Jpn. Pat. Laid-Open Publication No. 2000-10315
Patent Document 4: Jpn. Pat. Laid-Open Publication No. H10-213917

DISCLOSURE OF THE INVENTION

Problems to be Solved by the Invention

The problem to be solved by the present invention is to solve the above-mentioned defects of the conventional electrophotographic photoreceptor belts, and to improve crack resistance of the electrophotographic photoreceptor belt exposed to an environment under high temperature and high humidity and to provide an electrophotographic photoreceptor belt which is improved in wear resistance of a belt-rear-side reinforcing layer.

Means for Solving the Problems

The inventors of the present invention paid intensive research efforts to dissolve the conventional problems and, as a result, they found that an electrophotographic photoreceptor belt wherein a polycarbonate resin composition containing specific silicone-modified polyurethane is used as a rear side reinforcing film has low surface free energy and is excellent in wear resistance, and thus completed the present invention.

Thus, the present invention relates to a polycarbonate resin composition for a rear side reinforcing layer and an electrophotographic photoreceptor belt using the same shown below.

1) A polycarbonate resin composition for a rear side reinforcing layer of an electrophotographic photoreceptor belt, which is a blend of (A) 100 parts by weight of a polycarbonate resin and (B) 0.01 to 5 parts by weight of silicone-modified polyurethane obtained by reacting a diol component (a) represented by the following general formula (I), an active hydrogen-containing polysiloxane compound (b), a polyisocyanate component (c) and, if necessary, a chain extender (d).

[Chemical Formula 1]

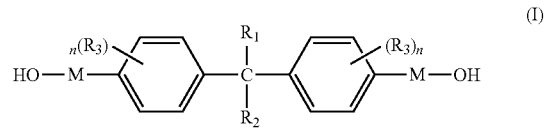

(In the formula (I), $R_1$ and $R_2$ independently represent a hydrogen atom or an alkyl group. $R_3$ represents a hydrogen atom, an alkyl group, an alkoxy group, a halogen atom or an alkoxycarbonyl group. "M" represents a single bond, a substituted or unsubstituted alkylene group or an oxyalkylene group. "n" represents an integer of 0 to 4.)

2) The polycarbonate resin composition for a rear side reinforcing layer according to claim 1, wherein said active hydrogen-containing polysiloxane compound (b) is a compound selected from the group consisting of active hydrogen-containing polysiloxane and a copolymer of active hydrogen-containing polysiloxane and caprolactone.

3) The polycarbonate resin composition for a rear side reinforcing layer according to claim 1, wherein the content of a siloxane component in said silicone-modified polyurethane is 5 to 80% by weight.

4) The polycarbonate resin composition for a rear side reinforcing layer according to claim 1, wherein said diol component represented by the general formula (I) is 2,2-bis(4-hydroxyphenyl)propane or an alkyleneoxide adduct of 2,2-bis(4-hydroxyphenyl)propane.

5) The polycarbonate resin composition for a rear side reinforcing layer according to claim 1, wherein said polycarbonate resin is produced by using as a raw material at least one bisphenol selected from the group consisting of 1,1'-biphenyl-4,4'-diol, 2,2-bis(4-hydroxyphenyl)propane, 1,1-bis(4-hydroxyphenyl)cyclohexane and 2,2-bis(4-hydroxy-3-methylphenyl)propane.

6) The polycarbonate resin composition for a rear side reinforcing layer according to claim 1, wherein the intrinsic viscosity of said polycarbonate resin is 1.0 to 1.6 dl/g.

7) An electrophotographic photoreceptor belt having a belt conductive support, a photosensitive layer and a rear side reinforcing layer, characterized in that the polycarbonate resin composition according to anyone of claims 1 to 6 is used as a material for said rear side reinforcing layer.

8) The electrophotographic photoreceptor belt according to claim 7, wherein said photosensitive layer is a multilayer type photosensitive layer separated into a charge generating layer and a charge transport layer.

9) The electrophotographic photoreceptor belt according to claim 8, wherein a binder resin used for said charge transport layer is a polycarbonate resin.

10) The electrophotographic photoreceptor belt according to claim 9, wherein the intrinsic viscosity of said binder resin is 1.0 to 1.6 dl/g.

11) The electrophotographic photoreceptor belt according to claim 9, wherein said binder resin is a polycarbonate resin produced by using as a raw material at least one bisphenol selected from the group consisting of 1,1'-biphenyl-4,4'-diol, 2,2-bis(4-hydroxyphenyl)propane, 1,1-bis(4-hydroxyphenyl)cyclohexane and 2,2-bis(4-hydroxy-3-methylphenyl)propane.

Effects of the Invention

According to the present invention, by using a polycarbonate resin composition containing specific silicone-modified polyurethane as a film for a rear side reinforcing layer, crack resistance of the electrophotographic photoreceptor belt which is exposed to a history under an environment of high temperature and high humidity is improved compared to a conventional art.

BEST MODE FOR CARRYING OUT THE INVENTION

1. Polycarbonate Resin Composition

The polycarbonate resin composition according to the present invention is a blend of a polycarbonate resin (A) and silicone-modified polyurethane (B).

(1) Polycarbonate Resin

The polycarbonate resin (A) to be used in the present invention is not particularly limited and various resins can be exemplified. Generally, an aromatic polycarbonate produced by reacting bisphenols with a carbonate precursor (a carbonate-forming compound) can be used.

Examples of bisphenols, though various compounds can be exemplified, include 1,1'-biphenyl-4,4'-diol, bis(4-hydroxyphenyl)methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane (bisphenol A: BPA), 2,2-bis(4-hydroxy-3-t-butylphenyl)propane, 2,2-bis(4-hydroxy-3-methylphenyl)propane, 1,1-bis(4-hydroxyphenyl)cyclopentane, 1,1-bis(4-hydroxyphenyl)cyclohexane (bisphenol Z: BPZ), 2,2-bis(4-hydroxyphenyl)hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, $\alpha,\omega$-bis[2-(p-hydroxyphenyl)ethyl]polydimethylsiloxane, $\alpha,\omega$-bis[3-(o-hydroxyphenyl)propyl]polydimethylsiloxane, 4,4'-[1,3-phenylene-bis(1-methylethylidene)]bisphenol, and 1,1-bis(4-hydroxyphenyl)-1-phenylethane.

Two or more of these bisphenols can be used in combination with each other. Among them, examples of the particularly preferable bisphenols include a compound selected from the group consisting of 1,1'-biphenyl-4,4'-diol, 2,2-bis(4-hydroxyphenyl)propane, 1,1-bis(4-hydroxyphenyl)cyclohexane and 2,2-bis(4-hydroxy-3-methylphenyl)propane.

Furthermore, it is more preferable to select from the group consisting of 1,1-bis(4-hydroxyphenyl)cyclohexane and 2,2-bis(4-hydroxyphenyl)propane, most preferable to select from 2,2-bis(4-hydroxyphenyl)propane.

Examples of carbonate-forming compounds include phosgenes such as phosgene or triphosgene and bisarylcarbonates such as diphenylcarbonate, di-p-tolylcarbonate, phenyl-p-tolylcarbonate, di-p-chlorophenylcarbonate, dinaphthylcarbonate and the like. Two or more of these compounds can be used in combination with each other.

The polycarbonate resin according to the present invention can be produced by a known method used for producing polycarbonate from the above-mentioned bisphenols and a carbonate precursor, for example, a direct reaction process of bisphenols and phosgene (a phosgene method) and an ester exchange reaction (a transesterification method) of bisphenols with diarylcarbonates (bisarylcarbonates).

According to the phosgene method, in general, the bisphenols are reacted with phosgene under the presence of an acid coupling agent and a solvent. Examples of acid coupling agents include pyridine and hydroxides of alkali metals such as sodium hydroxide, potassium hydroxide and the like. Examples of solvents include methylene chloride, chloroform, chlorobenzene and xylene.

In addition, for the purpose of accelerating the condensation polymerization reaction, it is preferable to add a catalyst such as a tertiary amine such as triethylamine or a quaternary ammonium salt into the reaction system. Moreover, it is also preferable to add monofunctional compounds such as phenol, p-t-butylphenol, p-cumylphenol, a long-chain alkyl-substituted phenol or the like as a molecular weight adjuster for adjusting the degree of polymerization.

If desired, an antioxidant such as sodium sulfite or hydrosulfite and/or a branching agent such as fluoroglycin or isatin bisphenol can be added by a small amount. Generally, it is proper to conduct the reaction in a temperature range between 0 and 150° C., preferably between 5 and 40° C. While the reaction time may vary depending on the reaction temperature, it is normally between 0.5 minutes and 10 hours, preferably between 1 minute and 2 hours. It is desirable to keep the pH of the reaction system not below 10 during the reaction.

According to the transesterification method, the bisphenols and bisarylcarbonate are mixed and reacted with each other at high temperature under reduced pressure.

The reaction is generally carried out in a temperature range between 150 and 350° C., preferably between 200 and 300° C. The ultimate pressure is preferably reduced to 1 mmHg or less to remove the phenols, which are derived from said bisarylcarbonate and are produced as a result of the transesterification reaction, from the reaction system by distillation.

While the reaction time varies depending on the reaction temperature and the reduced pressure level, it is generally 1 to 4 hours. The reaction is preferably carried out in an atmosphere of inert gas such as nitrogen or argon. If desired, the reaction may be carried out by adding a molecular weight adjuster, an antioxidant and/or a branching agent.

Of the phosgene method and the transesterification method, the phosgene method is more preferable in order to obtain an intended intrinsic viscosity.

Though the molecular weight of the polycarbonate resin thus obtained is not particularly limited, the intrinsic viscosity thereof is preferably 1.0 to 1.6 dl/g, more preferably 1.1 to 1.4 dl/g. When using the polycarbonate resin having the intrinsic viscosity within the above range as a resin for a rear side reinforcing layer of an electrophotographic photoreceptor, a rear side reinforcing layer having sufficient crack resistance and film-forming properties can be obtained, and hence an electrophotographic photoreceptor having a high durability can be obtained.

In case when the intrinsic viscosity is lower than 1.0 dl/g, film forming properties may be deteriorated. In case when the intrinsic viscosity is higher than 1.6 dl/g, crack resistance may be deteriorated.

The polycarbonate resin having the intrinsic viscosity of above-mentioned restricted range can be produced by, for example, controlling the amount of the molecular weight adjuster to be added. To be more precise, it can be obtained by adjusting the amount of the molecular weight adjuster added to be in the range of 0.6 to 1.2 mol % based upon the total amount of bisphenols.

(2) Silicone-Modified Polyurethane

Then, it will be described below about the silicone-modified polyurethane to be used as a component (B) according to the present invention.

The silicone-modified polyurethane is obtained by reacting a diol component (a), an active hydrogen-containing polysiloxane compound (b), a polyisocyanate component (c) and, if necessary, a chain extender (d).

(a) Diol Component

As the diol component (a), a compound represented by the following general formula (I) is used.

[Chemical Formula 2]

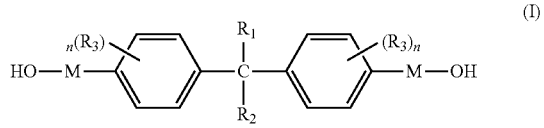

(I)

In the above formula (I), $R_1$ and $R_2$ independently represent a hydrogen atom or an alkyl group. $R_3$ represents a hydrogen atom, an alkyl group, an alkoxy group, a halogen atom or an alkoxycarbonyl group. M represents a single bond, a substituted or unsubstituted alkylene group or an oxyalkylene group. "n" represents an integer of 0 to 4.

Preferable examples of the above-mentioned diol component (a) include 2,2-bis(4-hydroxyphenyl)propane and an alkyleneoxide adduct of 2,2-bis(4-hydroxyphenyl)propane (bisphenol A). The preferable example of the alkyleneoxide is ethyleneoxide (EO).

(b) Active Hydrogen-Containing Polysiloxane Compound

Examples of the active hydrogen-containing polysiloxane compound (b) include an active hydrogen-containing polysiloxane and a copolymer of said active hydrogen-containing polysiloxane and caprolactone.

Examples of the active hydrogen-containing polysiloxane include the compounds represented by the following structural formulae. These compounds are commercially available.

[Chemical Formula 3]

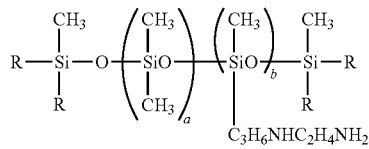

R represents a methyl group or a methoxy group.
a = 1-10 b = 2-10

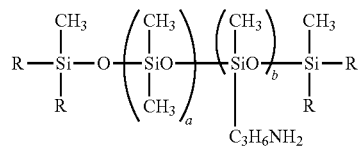

R represents a methyl group or a methoxy group.
a = 1-10 b = 2-10

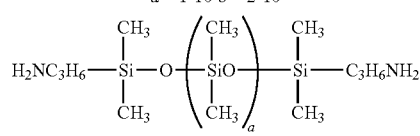

a = 0~200

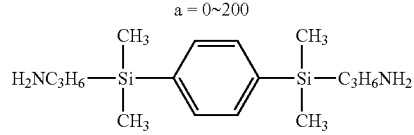

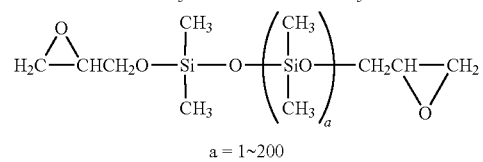

a = 1~200

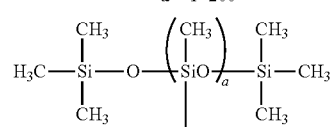

a = 1~10

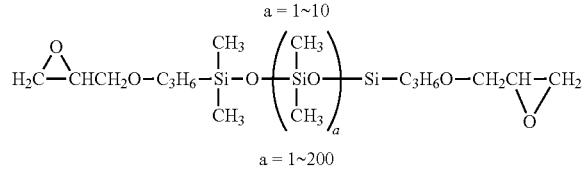

a = 1~200

[Chemical Formula 4]

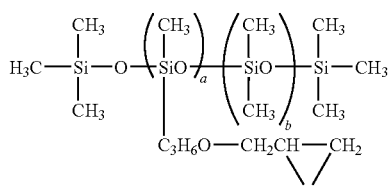

a = 1~10, b = 2~10

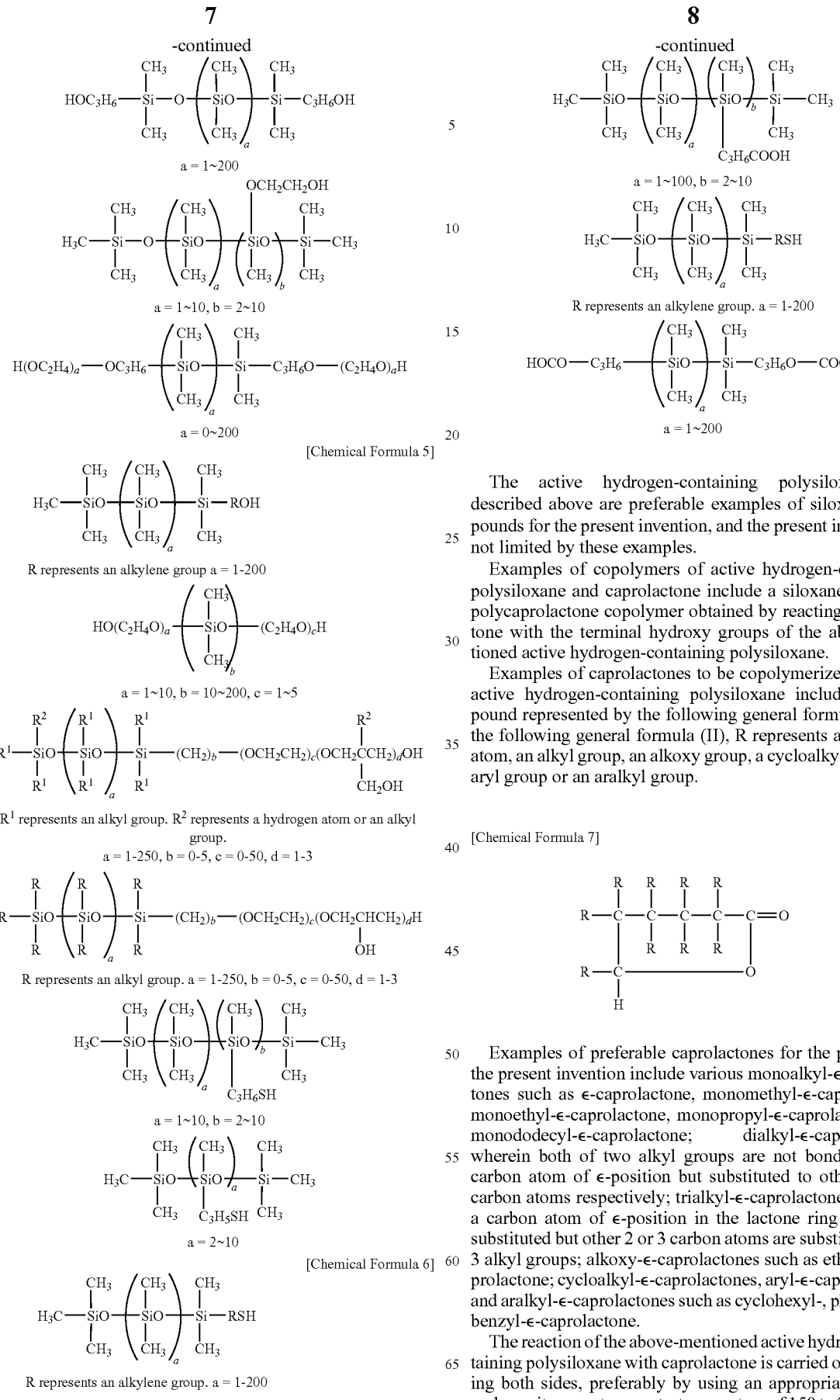

The active hydrogen-containing polysiloxanes as described above are preferable examples of siloxane compounds for the present invention, and the present invention is not limited by these examples.

Examples of copolymers of active hydrogen-containing polysiloxane and caprolactone include a siloxane-modified polycaprolactone copolymer obtained by reacting caprolactone with the terminal hydroxy groups of the above-mentioned active hydrogen-containing polysiloxane.

Examples of caprolactones to be copolymerized with the active hydrogen-containing polysiloxane include a compound represented by the following general formula (II). In the following general formula (II), R represents a hydrogen atom, an alkyl group, an alkoxy group, a cycloalkyl group, an aryl group or an aralkyl group.

[Chemical Formula 7]

Examples of preferable caprolactones for the purpose of the present invention include various monoalkyl-ε-caprolactones such as ε-caprolactone, monomethyl-ε-caprolactone, monoethyl-ε-caprolactone, monopropyl-ε-caprolactone and monododecyl-ε-caprolactone; dialkyl-ε-caprolactones wherein both of two alkyl groups are not bonded with a carbon atom of ε-position but substituted to other similar carbon atoms respectively; trialkyl-ε-caprolactones wherein a carbon atom of ε-position in the lactone ring is not di-substituted but other 2 or 3 carbon atoms are substituted with 3 alkyl groups; alkoxy-ε-caprolactones such as ethoxy-ε-caprolactone; cycloalkyl-ε-caprolactones, aryl-ε-caprolactones and aralkyl-ε-caprolactones such as cyclohexyl-, phenyl- and benzyl-ε-caprolactone.

The reaction of the above-mentioned active hydrogen-containing polysiloxane with caprolactone is carried out by mixing both sides, preferably by using an appropriate catalyst under a nitrogen stream, at a temperature of 150 to 200° C. for several hours to over 10 hours, whereby siloxane-modified polycaprolactone copolymer can be obtained.

The polyisocyanate (c) to be able to use in the present invention is diisocyanate having two isocyanate groups in one molecular. Examples of such diisocyanate include tolylene diisocyanate (TDI), diphenylmethane diisocyanate (MDI), phenylene diisocyanate, xylylene diisocyanate (XDI), tetramethyl xylylene diisocyanate (TMXDI), 1,6-hexamethylenediisocyanate (HDI), isophoronediisocyanate (IPDI), nuclearly hydrogenated MDI (H12-MDI), nuclearly hydrogenated XDI (H6-XDI), naphthalene diisocyanate (NDI) and norbornane diisocyanate (NBDI).

Among them, H12-MDI and H6-XDI are preferable for the present invention.

It is also possible to use prepolymerized diisocyanate which is obtained by reacting the above diisocyanates with diols, diamines or the like. In addition, a compound wherein a part of a diisocyanate compound is oligomerized to be a tri- or more-functional isocyanate compound can be used as far as the effect of the present invention is not impaired.

Known methods can be used for olygomerization of diisocyanate compounds. For example, isocyanuration, allophanate-formation or biuret-formation, or urethanation or ureation by multifunctional alcohols or multifunctional amines Examples of the chain extender (d) to be used, if necessary, for the present invention include short-chain diols such as ethylene glycol and butane diol; polyether diols such as polyethyleneglycol, polypropyleneglycol and alkyleneoxide adducts of bisphenol compounds; polyester diols such as polyethylene adipate; polycarbonate diols; and divalent amines such as ethylenediamine. Among them, short-chain diols such as ethyleneglycol and butanediol are preferable for the present invention.

Process for producing the silicone-modified polyurethane of the present invention is not particularly limited. It can be produced by reacting the above-mentioned diol component (a), an active hydrogen-containing polysiloxane compound (b), polyisocyanate (c) and, if necessary, a chain extender (d) as raw materials by means of a process technique of producing polyurethane commonly used.

The content of a siloxane component in the silicone-modified polyurethane is preferably 5 to 80% by weight. In case when the content is less than 5% by weight, low-surface free energy property which is the purpose of the present invention may not exhibit sufficiently. In case when the content is more than 80% by weight, the performance of polyurethane may be deteriorated and it may be difficult to make a homogeneous mixture with a polycarbonate resin which would not be desirable for a resin composition for an electrophotographic photoreceptor.

The term "siloxane component" here means a siloxane unit represented by "—Si(R)$_2$O—", wherein R represents a substituted or unsubstituted alkyl group, comprised in the silicone-modified polyurethane.

The content of the silicone-modified polyurethane is 0.01 to 5 parts by weight, preferably 0.02 to 3 parts by weight based upon 100 parts by weight of the polycarbonate resin.

In addition, other lubricants such as a silicone resin, a fluorocarbon resin and polysilane can be used together in the polycarbonate resin composition of the present invention, if required, as far as the performance as an electrophotographic photoreceptor is not inhibited.

(1) Structure of Electrophotographic Photoreceptor Belt

The electrophotographic photoreceptor belt of the present invention has at least a belt conductive support and a photosensitive layer (photoconductive layer). More precisely, it has a photosensitive layer provided on a belt conductive support. The photosensitive layer is formed of a material wherein a charge generating material which generates charge by exposure to light and a charge transport material which transports charge are dispersed in a binder resin.

The structure of the photosensitive layer is not particular limited. It can be of single-layer type wherein the charge generating material and the charge transport material are dispersed together in a binder resin, or it can also be of multilayer type which is formed of a combination of multiple layers such as a layer which is functionally separated to a charge generating layer containing a charge generating material and a charge transport layer containing a charge transport material.

Examples of the multilayer type include a photosensitive layer comprising two layers which are a charge generating layer which mainly comprises a charge generating material and a charge transport layer which mainly comprises a charge transport material. In general, a charge generating layer is formed on the belt conductive support and a charge transport layer is formed on the charge generating layer.

For the present invention, an electrophotographic photoreceptor having a multilayer type photosensitive layer comprising two layers of a charge generating layer and a charge transport layer is preferable. The laminating order is preferably "a conductive support"/"a charge generating layer"/"a charge transport layer".

The electrophotographic photoreceptor belt of the present invention has a reinforcing layer on a rear side of the belt conductive support (the opposite side of the side wherein the photosensitive layer is provided). The rear side reinforcing layer is provided for the purpose of preventing the curl.

In addition, the electrophotographic photoreceptor belt of the present invention can have a protection layer, an adhesive layer or the like if necessary. The protection layer can be formed on the surface of the photosensitive layer for the purpose of a hard coat. The adhesive layer can be formed between the conductive support belt substrate and the photosensitive layer for the purpose of an excellent adhesion of the conductive support belt substrate with the photosensitive layer.

(2) Belt Conductive Support

As the belt conductive support (conductive support belt substrate) to be used for the electrophotographic photoreceptor belt of the present invention, a metallic material such as aluminum, stainless steel or nickel, or a polyester film, a phenol resin film or paper having an electrically conductive layer of aluminum, palladium, tin oxide, indium oxide or the like on the surface thereof can be used.

Furthermore, it is possible to reinforce by coating a resin such as polycarbonate, polyarylate, polyethylene terephthalate, polybutylene terephthalate, polyethylene naphthalate, polybutylene naphthalate and polyimide.

Among them, aluminum metallized polyester is particularly preferable. Though the thickness of the belt conductive support is not particularly limited, it is preferably in the range of 20 to 100 μm.

(3) Photosensitive Layer

The electrophotographic photoreceptor belt of the present invention has a photosensitive layer formed on the conductive support. The photosensitive layer is formed by a binder resin wherein a charge generating material which generates charge by exposure to light and a charge transport material which transport charge are dispersed.

As a charge generating material, organic pigments of azoxybenzenes, disazo compounds, trisazo compounds, benzimidazoles, polycyclic quinolines, indigoids, quinacridones, phthalocyanines, perylenes, methines and the like can be used. The charge generating material can be used each independently, or two or more of them can be used in combination with each other.

Examples of charge transport materials include polytetracyanoethylene; fluorenone compounds such as 2,4,7-trinitro-9-fluorenone; nitro compounds such as dinitroanthracene; succinic anhydride; maleic anhydride; dibromo maleic anhydride; triphenylmethane compounds; oxadiazole compounds such as 2,5-di(4-dimethylaminophenyl)-1,3,4-oxadiazole; styryl compounds such as 9-(4-diethylaminostyryl)anthracene; stilbene compounds such as 4-(2,2-bisphenyl-ethene-1-il)triphenylamine and 4-(2,2-bisphenyl-ethen-1-yl)-4',4"-dimethyltriphenylamine; carbazole compounds such as triphenylamine-poly(N-vinylcarbazole); pyrazoline compounds such as 1-phenyl-3-(p-dimethylaminophenyl) pyrazoline; amine derivatives such as 4,4',4"-tris(N,N-diphenylamino)triphenylamine and N,N'-bis(3-methylphenyl)-N,N'-bis(phenyl)benzidine; conjugated unsaturated compounds such as 1,1-bis(4-diethylaminophenyl)-4,4-diphenyl-1,3-butadiene, hydrazone compounds such as 4-(N,N-diethylamino)benzaldehyde-N,N-diphenylhydrazaone; nitrogen-containing cyclic compounds such as indole compounds, oxazole compounds, isooxazole compounds, thiazole compounds, thiadiazole compounds, imidazole compounds, pyrazole compounds, pyrazoline compounds and triazole compounds, and condensed polycyclic compounds. The above-listed charge transport materials can be used each independently, or two or more of them can be used in combination with each other.

(4) Material for Rear Side Reinforcing Layer

The electrophotographic photoreceptor belt of the present invention is characterized in that the polycarbonate resin composition of the present invention comprising the above-mentioned silicone-modified polyurethane is used as a material for the rear side reinforcing layer, whereby an electrophotographic photoreceptor belt excellent in durability wherein a crack does not generate with ease even under high temperature and high humidity can be obtained.

As the polycarbonate resin composition for rear side reinforcement, a composition which can be molded with ease by a known wet molding used for producing an electrophotographic photoreceptor belt such as a solution casting method, a casting method, a spray coating method, a dip coating method (a dip method) or the like. In order that the electrophotographic photoreceptor belt molded by wet molding has sufficient crack resistance and a film-forming property, the intrinsic viscosity of the polycarbonate resin is preferably in the range of 1.0 to 1.6 dl/g, more preferably in the range of 1.0 to 1.4 dl/g.

(5) Binder Resin for Photosensitive Layer

According to the electrophotographic photoreceptor belt of the present invention, while the binder resin for the photosensitive layer is not particularly limited, it is preferable to use a polycarbonate resin material comprising a polycarbonate resin as a main component.

Examples of the polycarbonate resin to be used for the binder resin for the photosensitive layer include a polycarbonate resin produced by using as a raw material at least one bisphenol selected from the group consisting of 1,1'-biphenyl-4,4'-diol, 2,2-bis(4-hydroxyphenyl)propane, 1,1-bis(4-hydroxyphenyl)cyclohexane and 2,2-bis(4-hydroxy-3-methylphenyl)propane.

In addition, in order that the electrophotographic photoreceptor belt molded by wet molding has sufficient crack resistance and a film-forming property, the intrinsic viscosity of said polycarbonate resin as a binder resin for the photosensitive layer is preferably in the range of 1.0 to 1.6 dl/g. In case when the intrinsic viscosity is lower than 1.0 dl/g, film-forming property may be deteriorated. In case when the intrinsic viscosity is higher than 1.6 dl/g, crack resistance may be deteriorated. More preferably, the intrinsic viscosity is in the range of 1.1 to 1.4 dl/g.

The above-mentioned polycarbonate resin can comprise other polymers such as other polycarbonate, polyester, polystyrene, polyamide, polyurethane, silicone resins, polymethylmethacrylate, polyoxyphenylene, polyvinylacetate and fluorine-modified polymers within the range that the performance of said polycarbonate is maintained. Among them, it is preferable to add silicone resins. Examples of the silicone resins include a silicone-copolymerized polymer such as silicone-copolymerized polyurethane and silicone-copolymerized polycarbonate. Among them, silicone-copolymerized polyurethane is particularly preferable. It is also preferable to add fluorine-modified polymers such as fluoroalkyl-modified polymethylmethacrylate. In case when these other polymers are used, the amount to be blended is preferably less than 1% by weight based upon the total amount of the above-mentioned polycarbonate resin material.

However, as the polycarbonate resin which is the main component of the polycarbonate resin material to be used for a photosensitive layer (in case of multilayer type, a charge transport layer), it is preferable to use the same polycarbonate resin as the polycarbonate resin which is the main component of the polycarbonate resin composition to be used for the material for a rear side reinforcing layer for the reason that linear expansion coefficient is equal to each other and difference of stress between obverse side and reverse side at the time of moisture absorption is hardly produced.

Moreover, the polycarbonate resin composition for a rear side reinforcing layer of the present invention can be used as the above-mentioned binder resin for a photosensitive layer, whereby an electrophotographic photoreceptor belt having improved wear resistance and a long service life of the photoreceptor can be obtained.

The above-mentioned polycarbonate resin for the binder resin for a photosensitive layer can further comprise known additives such as a phenolic antioxidant, a sulfuric antioxidant, a benzotriazole ultraviolet absorbent, a benzophenone ultraviolet absorbent or the like. In that case, it is preferable to use the additives by the amount of less than 1% by weight based upon the total amount of solid contents.

In case when the photosensitive layer is of multilayer type separated into a charge generating layer and a charge transport layer, it is preferable to use the above-mentioned polycarbonate resin at least as a binder resin for the charge transport layer.

In case when the above-mentioned polycarbonate resin is used as a binder resin for the charge transport layer of a multilayer type photosensitive layer, examples of a binder resin for the charge generating layer include a polyvinyl butyral resin, a polyvinyl formal resin, a silicone resin, a polyamide resin, a polyester resin, a polystyrene resin, a polycarbonate resin, a polyvinyl acetate resin, a polyurethane resin, a phenoxy resin, an epoxy resin and various celluloses. Preferably, a polyvinyl butyral resin is used.

(6) Formation of a Charge Generating Layer and a Charge Transport Layer:

Regarding the case when the photosensitive layer is a multilayer type photosensitive layer comprising a charge generating layer and a charge transport layer, the method for formation thereof will be described below.

The charge generating layer and the charge transport layer, which are a photosensitive layer, can be formed by firstly dissolving the above-mentioned charge generating material or charge transport material into a suitable solvent with a binder resin respectively, then coating the solution by means of a method such as a solution casting method, a casting method, a spray coating method, a dip coating method or the like, and drying the coating layer.

Solvents to be used here can be roughly classified into a halogen type organic solvent and a non-halogen type organic solvent.

Examples of halogen type organic solvents include dichloromethane, chloroform, monochlorobenzene, 1,1,1-trichloroethane, monochloroethane and carbon tetrachloride. Among them, it is preferable to use dichloromethane.

Examples of non-halogen type organic solvents include aromatic hydrocarbons such as toluene and xylene, ketones such as acetone, methylethylketone, cyclohexanone and isophoron, ethers such as tetrahydrofuran, 1,4-dioxane, ethylene glycol diethyl ether and ethylcellosolve, esters such as methyl acetate and ethyl acetate as well as dimethyl formamide, dimethyl sulfoxide and diethyl formamide. For the purpose of the present invention, any of the above-listed solvents can be used each independently, or two or more of them can be used in combination with each other.

When dissolving the binder resin into a solvent to form a charge transport layer, it is preferable to prepare a binder resin solution having the range of 1-20% by weight for use. It is also possible to recycle a used electrophotographic photoreceptor belt commercially available by dissolving the charge transport layer of said used electrophotographic photoreceptor belt with the above-listed solvent and then forming a new charge transport layer thereon.

The mixing ratio of the charge generating material and the binder resin is preferably within a range between 10:1 and 1:20. The preferable thickness of the charge generating layer is 0.01 to 20 μm, more preferably 0.1 to 2 μm. The mixing ratio of the charge transport material and the binder resin is preferably within a range between 10:1 and 1:10. The preferable thickness of the charge transport layer is 2 to 100 μm, more preferably 5 to 40 μm.

(7) Formation of Rear Side Reinforcing Layer:

The rear side reinforcing layer can be formed with ease by using the above-mentioned polycarbonate resin composition for a rear side reinforcing layer by means of a known wet molding commonly used for producing an electrophotographic photoreceptor belt such as a solution casting method, a casting method, a spray coating method, a dip coating method (a dip method) or the like. As the solvents to be used here, halogen type organic solvents or non-halogen type organic solvents which are same as the ones used for forming a charge transport layer can be used.

While the thickness of the rear side reinforcing layer is not particular limited, the preferable thickness of the rear side reinforcing layer is 1 to 100 μm, more preferably 5 to 50 μm.

EXAMPLES

The present invention will be described in more detail below referring to Examples. Note that the scope of the present invention is not limited by the following examples.

Examples of Synthesis 1

Synthesis of Silicone-Modified Polyurethane (PU-1)

150 parts by weight of polysiloxane having a structure represented by the following formula (III) (molecular weight; 4500) and 30 parts by weight of an ethyleneoxide adduct of bisphenol A were dissolved into 250 parts by weight of methylethylketone and 100 parts by weight of N,N-dimethylformamide.

The solution was heated to 60° C., and then 33 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-1) was obtained.

[Chemical Formula 8]

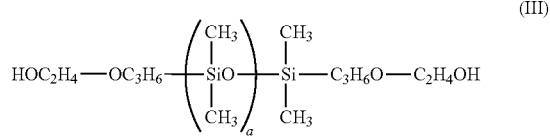

"$a$" represents a number bringing a molecular weight of 4500.

Examples of Synthesis 2

Synthesis of Silicone-Modified Polyurethane (PU-2)

150 parts by weight of polysiloxane having a structure represented by the following formula (IV) (molecular weight; 5200), 10 parts by weight of an ethyleneoxide adduct of bisphenol A and 12 parts by weight of 1,4-butanediol were dissolved into 250 parts by weight of methylethylketone and 100 parts by weight of N,N-dimethylformamide.

The solution was heated to 60° C., and then 52 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-2) was obtained.

[Chemical Formula 9]

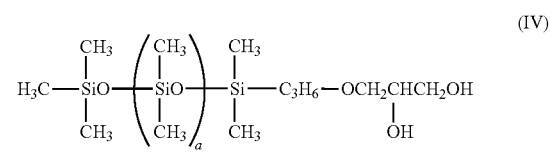

"$a$" represents a number bringing a molecular weight of 5200.

Examples of Synthesis 3

Synthesis of Silicone-Modified Polyurethane (PU-3)

75 parts by weight of polysiloxane having a structure represented by the above formula (III), 75 parts by weight of polysiloxane having a structure represented by the above formula (IV), 35 parts by weight of an ethyleneoxide adduct of bisphenol A and 12 parts by weight of 1,4-butanediol were dissolved into 250 parts by weight of methylethylketone and 100 parts by weight of N,N-dimethylformamide.

The solution was heated to 60° C., and then 75 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-3) was obtained.

Examples of Synthesis 4

Synthesis of Silicone-Modified Polyurethane (PU-4)

310 parts by weight of ε-caprolactone and 0.05 parts by weight of tetrabutyltitanate were added with 150 parts by weight of polysiloxane having a structure represented by the following formula (V) (molecular weight; 980), and then the reaction was carried out at 180° C. for 10 hours under nitrogen stream, whereby polysiloxane having terminal OH having a molecular weight of 3010 (siloxane-modified polycaprolactone copolymer) was obtained.

75 parts by weight of the polysiloxane having terminal OH, 69 parts by weight of an ethyleneoxide adduct of bisphenol A and 75 parts by weight of polybutylene adipate (molecular weight 2000) were dissolved into 200 parts by weight of methylethylketone and 100 parts by weight of N,N-dimethylformamide.

The solution was heated to 60° C., and then 72 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-4) was obtained.

[Chemical Formula 10]

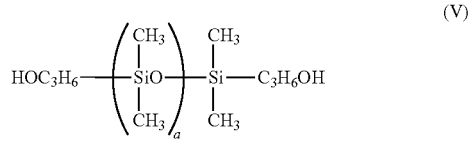

(V)

"a" represents a number bringing a molecular weight of 980.

Examples of Synthesis 5

Synthesis of Silicone-Modified Polyurethane (PU-5)

310 parts by weight of ε-caprolactone and 0.05 parts by weight of tetrabutyltitanate were added with 150 parts by weight of polysiloxane having a structure represented by the following formula (VI) (molecular weight; 1900), and then the reaction was carried out at 180° C. for 10 hours under nitrogen stream, whereby polysiloxane having terminal OH having a molecular weight of 5850 (siloxane-modified polycaprolactone copolymer) was obtained.

75 parts by weight of the polysiloxane having terminal OH, 69 parts by weight of an ethyleneoxide adduct of bisphenol A and 75 parts by weight of polybutylene adipate (molecular weight 2000) were dissolved into 200 parts by weight of methylethylketone and 100 parts by weight of N,N-dimethylformamide.

The solution was heated to 60° C., and then 93 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-5) was obtained.

[Chemical Formula 11]

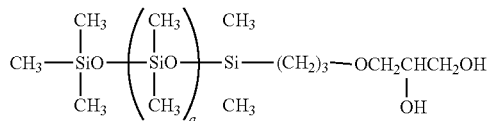

(VI)

"a" represents a number bringing a molecular weight of 1900.

Examples of Synthesis 6

Synthesis of Silicone-Modified Polyurethane (PU-6)

310 parts by weight of ε-caprolactone and 0.05 parts by weight of tetrabutyltitanate were added with 75 parts by weight of polysiloxane having a structure represented by the above formula (V) and 75 parts by weight of polysiloxane having a structure represented by the above formula (VI), and then the reaction was carried out at 180° C. for 10 hours under nitrogen stream, whereby polysiloxane having terminal OH having a molecular weight of 4416 (siloxane-modified polycaprolactone copolymer) was obtained.

75 parts by weight of the polysiloxane having terminal OH, 67 parts by weight of an ethyleneoxide adduct of bisphenol A and 75 parts by weight of polybutylene adipate (molecular weight 2000) were dissolved into 200 parts by weight of methylethylketone and 100 parts by weight of N,N-dimethylformamide.

The solution was heated to 60° C., and then 91 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-6) was obtained.

Examples of Synthesis 7

Synthesis of Silicone-Modified Polyurethane (PU-7)

310 parts by weight of ε-caprolactone and 0.05 parts by weight of tetrabutyltitanate were added with 150 parts by weight of polysiloxane having a structure represented by the above formula (V), and then the reaction was carried out at 180° C. for 10 hours under nitrogen stream, whereby polysiloxane having terminal OH having a molecular weight of 7100 (siloxane-modified polycaprolactone copolymer) was obtained.

25 parts by weight of the polysiloxane having terminal OH, 20 parts by weight of an ethyleneoxide adduct of bisphenol A and 27 parts by weight of 1,4-butanediol were dissolved into 200 parts by weight of methylethylketone and 100 parts by weight of N,N-dimethylformamide.

The solution was heated to 60° C., and then 96 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-7) was obtained.

Examples of Synthesis 9

Synthesis of Polycarbonate Resin (PC-1)

91.2 g (0.4 mol) of bisphenol A, manufactured by Nippon Steel Chemical Co., Ltd. in Japan (hereinafter, "BPA"), and 0.1 g of hydrosulfite were dissolved into 1100 ml of 5 w/w % aqueous solution of sodium hydroxide.

Then, 500 ml of dichloromethane was added to the aqueous solution and 60 g of phosgene was blown into the solution over a period of 60 minutes, while stirring the solution and keeping the temperature of the solution at 15° C.

After completion of blowing phosgene in, 0.56 g of p-t-butylphenol, manufactured by Dainippon Ink And Chemicals, Inc. (hereinafter, "PTBP"), was added as a molecular weight adjuster and the reaction solution was stirred intensely to emulsify. After emulsification, 0.4 ml of triethylamine was added and the emulsion was stirred at 20 to 25° C. for about an hour for polymerization.

After completion of the polymerization, the reaction solution was separated into an aqueous phase and an organic phase. The organic phase was neutralized by phosphoric acid and was washed repeatedly with water until the electric conductivity of the upper solution (aqueous phase) falls not higher than 10 μS/cm. The polymer solution thus obtained was dropped into warm water held to 50° C. and the solvent was removed by evaporation to obtain a white powdery precipitate. The precipitate thus obtained was filtered and dried at 105° C. for 24 hours to obtain powder of the polymer.

The intrinsic viscosity of the solution of the polymer in the solvent of methylene chloride with a concentration of 0.2 g/dl at 20° C. was 1.23 dl/g. The polymer thus obtained was analyzed by means of infrared absorption spectrometry, and as a result, the absorption due to a carbonyl group was observed at a position near 1,770 $cm^{-1}$ and the absorption due to an ether bond was observed at a position near 1,240 $cm^{-1}$, whereby it was confirmed that the polymer was a polycarbonate resin having a carbonate bond (hereinafter, "PC-1").

Examples of Synthesis 10

Synthesis of Polycarbonate Resin (PC-2)

A synthesis was carried out in the same manner as the synthesis of PC-1 except that BPA was replaced by 107.2 g of 1,1-bis(4-hydroxyphenyl)cyclohexane, manufactured by Taoka Chemical Co., Ltd. in Japan (hereinafter, "BPZ"). The intrinsic viscosity of the polymer thus obtained was 1.04 dl/g (hereinafter, "PC-2").

Examples of Synthesis 11

Synthesis of Polycarbonate Resin (PC-3)

A synthesis was carried out in the same manner as the synthesis of PC-1 except that the amount of PTBP was changed to 0.45 g. The intrinsic viscosity of the polymer thus obtained was 1.35 dl/g (hereinafter, "PC-3").

Examples of Synthesis 12

Synthesis of Polycarbonate Resin (PC-4)

A synthesis was carried out in the same manner as the synthesis of PC-1 except that the amount of BPA was changed to 36.4 g and 61.44 g of 2,2-bis(4-hydroxy-3-methylphenyl) propane, manufactured by Honshu Chemical Industry Co., Ltd. in Japan (hereinafter, "BPC") was used in combination with BPA. The intrinsic viscosity of the polymer thus obtained was 1.25 dl/g (hereinafter, "PC-4").

Examples of Synthesis 13

Synthesis of Polycarbonate Resin (PC-5)

A synthesis was carried out in the same manner as the synthesis of PC-1 except that the amount of BPA was changed to 77.5 g and 11.2 g of 1,1'-biphenyl-4,4'-diol, manufactured by Honshu Chemical Industry Co., Ltd. in Japan (hereinafter, "BP") was used in combination with BPA. The intrinsic viscosity of the polymer thus obtained was 1.24 dl/g (hereinafter, "PC-5").

Examples of Synthesis 14

Synthesis of Polycarbonate Resin (PC-6)

A synthesis was carried out in the same manner as the synthesis of PC-1 except that the amount of BPA was changed to 45.6 g and 53.6 g of BPZ was used in combination with BPA. The intrinsic viscosity of the polymer thus obtained was 1.14 dl/g (hereinafter, "PC-6").

Example 1

A coating solution was prepared by using 8 parts by weight of N,N'-bis(3-methylphenyl)-N,N'-bis(phenyl)benzidine, manufactured by SYNTEC (hereinafter, "TPD type CT agent", 8 parts by weight of PC-1 obtained as a result of the above described synthetic polymerization and 84 parts by weight of dichloromethane. The coating solution thus obtained was coated by a casting method onto a commercially available electrophotographic photoreceptor belt, manufactured by manufactured by Brother Industries, Ltd., trade name; "OP-4LC", which had been dismounted from the roller and from which the charge transport layer had been removed by tetrahydrofuran in advance. Then, the coated solution was dried in flowing air.

Furthermore, after wiping the rear side of the photoreceptor belt with tetrahydrofuran, a coating solution prepared by dissolving 10 parts by weight of PC-1, 100 parts by weight of dichloromethane and 0.01 parts by weight of PU-1 was coated thereon by a casting method, and then the coated solution was dried in flowing air. The electrophotographic photoreceptor belt after drying in flowing air was then dried at 60° C. for 8 hours, whereby an electrophotographic photoreceptor belt for a test having an about 20 μm-thick charge transport layer and an about 20 μm-thick rear side reinforcing layer (hereinafter, "OPC belt") was obtained.

The OPC belt thus prepared was mounted back again to the roller of OP-4LC and then placed in a thermo-hygrostat test machine at a cycle of 40° C.-95% RH for 2 hours and then 25° C.-50% RH for 2 hours. This cycle of high temperature-high humidity and normal temperature-low humidity was repeated for 24 times. Then, said OPC belt was taken out and mounted to a commercially available digital complex machine, manufactured by Brother Industries, Ltd., trade name; "MFC-9420CN". The machine was driven to print an entirely black solid image using recycled OA paper (LPR-A4-W; manufactured by Tochiman Co., Ltd.) in a thermo-hygrostat at 25° C. and 50% RH. The printed images in every 500 sheets were checked, and when a linear image defect was observed, the presence of a crack on the photoreceptor belt (a standard being 0.1×1 mm or larger) at that time was investigated. The printing number of sheets at the time of observing a crack was made into the index of durability. In addition, a thickness of the rear side reinforcing film at the time of counting the printing number of sheets was measured and wear amount at the time of printing 20,000 sheets of paper was determined by extrapolating. The results were shown in Table 1.

Example 2

An experiment was carried out in the same manner as Example 1 except for using PU-2 in place of PU-1.

Example 3

An experiment was carried out in the same manner as Example 1 except for using PU-3 in place of PU-1.

Example 4

An experiment was carried out in the same manner as Example 1 except for using PU-4 in place of PU-1.

Example 5

An experiment was carried out in the same manner as Example 1 except for using PU-5 in place of PU-1.

Example 6

An experiment was carried out in the same manner as Example 1 except for using PU-6 in place of PU-1.

Example 7

An experiment was carried out in the same manner as Example 1 except for using PU-7 in place of PU-1.

Example 8

An experiment was carried out in the same manner as Example 1 except for using PU-8 in place of PU-1.

Example 9

An experiment was carried out in the same manner as Example 1 except for using PC-2 in place of PC-1 and using PU-4 in place of PU-1.

Example 10

An experiment was carried out in the same manner as Example 1 except for using PC-2 in place of PC-1 used for the coating solution for the charge transport layer, using PC-3 in place of PC-1 used for a coating solution for the rear side reinforcing film, and using PU-4 in place of PU-1.

Example 11

An experiment was carried out in the same manner as Example 1 except for using PC-4 in place of PC-1 and using PU-4 in place of PU-1.

Example 12

An experiment was carried out in the same manner as Example 1 except for using PC-5 in place of PC-1 and using PU-4 in place of PU-1.

Example 13

An experiment was carried out in the same manner as Example 1 except for using 0.005 parts by weight of PU-4 in place of PU-1.

Example 14

An experiment was carried out in the same manner as Example 1 except for using 0.2 parts by weight of PU-4 in place of PU-1.

Example 14

An experiment was carried out in the same manner as Example 1 except for using 0.2 parts by weight of PU-4 in place of PU-1.

Example 15

An experiment was carried out in the same manner as Example 1 except for using PC-6 in place of PC-1 and using PU-4 in place of PU-1.

Comparative Example 1

An experiment was carried out in the same manner as Example 1 except that a rear side reinforcing film was not prepared.

Comparative Example 2

An experiment was carried out in the same manner as Example 9 except that a rear side reinforcing film was not prepared.

Comparative Example 3

An experiment was carried out in the same manner as Example 1 except that PU-1 was not used.

Comparative Example 4

An experiment was carried out in the same manner as Example 1 except that the amount of PU-1 was changed to 0.0005 parts by weight.

Comparative Example 5

An experiment was carried out in the same manner as Example 4 except for using 10 parts by weight of PU-1. However, the rear side reinforcing film was too soft and abnormal noise which was thought to be abnormality of drive caused by friction was generated from the drive roller and the driven roller.

TABLE 1

| | OPC Binder | Rear Side Reinforcing Film | Intrinsic Viscosity (dl/g) | Polyurethane (Type) | Polyurethane Amount (% by weight) | Printing Number of Sheets At the time of Crack Occurrence | Wear Amount of Rear Side Reinforcing Film (μm) |
|---|---|---|---|---|---|---|---|
| Example | | | | | | | |
| 1 | PC-1 | PC-1 | 1.23 | PU-1 | 0.1 | 24000 | 8.5 |
| 2 | PC-1 | PC-1 | 1.23 | PU-2 | 0.1 | 25000 | 8.0 |
| 3 | PC-1 | PC-1 | 1.23 | PU-3 | 0.1 | 24000 | 8.5 |
| 4 | PC-1 | PC-1 | 1.23 | PU-4 | 0.1 | 24500 | 8.0 |
| 5 | PC-1 | PC-1 | 1.23 | PU-5 | 0.1 | 24000 | 8.3 |
| 6 | PC-1 | PC-1 | 1.23 | PU-6 | 0.1 | 24000 | 8.2 |
| 7 | PC-1 | PC-1 | 1.23 | PU-7 | 0.1 | 23500 | 8.7 |
| 8 | PC-1 | PC-1 | 1.23 | PU-8 | 0.1 | 24500 | 8.3 |
| 9 | PC-2 | PC-2 | 1.04 | PU-4 | 0.1 | 23000 | 8.3 |
| 10 | PC-2 | PC-3 | 1.35 | PU-4 | 0.1 | 23500 | 8.0 |
| 11 | PC-4 | PC-4 | 1.25 | PU-4 | 0.1 | 23000 | 8.2 |
| 12 | PC-5 | PC-5 | 1.24 | PU-4 | 0.1 | 23000 | 8.2 |
| 13 | PC-1 | PC-1 | 1.23 | PU-4 | 0.05 | 23000 | 9.2 |
| 14 | PC-1 | PC-1 | 1.23 | PU-4 | 2 | 26000 | 6.8 |
| 15 | PC-6 | PC-6 | 1.14 | PU-4 | 0.1 | 23500 | 8.7 |
| Comparative Example | | | | | | | |
| 1 | PC-1 | | | | | 17500 | |
| 2 | PC-2 | | | | | 16500 | |
| 3 | PC-1 | PC-1 | 1.23 | | | 20500 | 14.0 |
| 4 | PC-1 | PC-1 | 1.23 | PU-1 | 0.005 | 21000 | 10.7 |
| 5 | PC-1 | PC-1 | 1.23 | PU-4 | 10 | Unable to test | Unable to test |

OPC Binder: Polycarbonate resin used for preparing a charge transport layer.
Intrinsic Viscosity: A value determined by using an Ubbelohde tube at 20° C. with a 0.2 w/v % dichloromethane solution and a Haggins constant of 0.45.
Wear Amount of Rear Side Reinforcing Film (μm): A wear amount after printing 20,000 sheets of paper was determined by extrapolation using the following formula:
"Wear amount of rear side reinforcing film" = "Wear amount by actual measurement (μm)" × 20,000/"printing number of sheets at the time of crack occurrence"

INDUSTRIAL APPLICABILITY

The polycarbonate resin composition of the present invention is a resin material excellent in wear resistance and crack resistance, and by using the same as a material for a rear side reinforcing layer of an electrophotographic photoreceptor belt, an electrophotographic photoreceptor belt excellent in durability wherein a crack does not occur with ease even under the environment of high temperature and high humidity can be obtained.

What is claimed is:

1. An electrophotographic photoreceptor belt having a belt conductive support, a photosensitive layer and a rear side reinforcing layer,
wherein a material for said rear side reinforcing layer is a polycarbonate resin composition, which is a blend of (A) 100 parts by weight of a polycarbonate resin and (B) 0.01 to 5 parts by weight of silicone-modified polyurethane obtained by reacting a diol component (a) represented by the following formula (I), an active hydrogen-containing polysiloxane compound (b), a polyisocyanate component (c) and, if necessary, a chain extender (d);

[Chemical Formula 1]

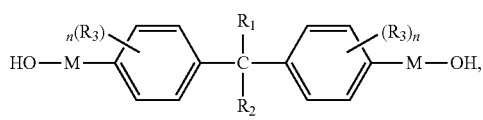

wherein $R_1$ and $R_2$ independently represent a hydrogen atom or an alkyl group; $R_3$ represents a hydrogen atom, an alkyl group, an alkoxy group, a halogen atom or an alkoxycarbonyl group; "M" represents a single bond, a substituted or unsubstituted alkylene group or an oxyalkylene group; and "n" represents an integer of 0 to 4.

2. The electrophotographic photoreceptor belt according to claim 1, wherein said active hydrogen-containing polysiloxane compound (b) is a compound selected from the group consisting of active hydrogen-containing polysiloxane and a copolymer of active hydrogen-containing polysiloxane and caprolactone.

3. The electrophotographic photoreceptor belt according to claim 1, wherein the content of a siloxane component in said silicone-modified polyurethane is 5 to 80% by weight.

4. The electrophotographic photoreceptor belt according to claim 1, wherein said diol component represented by the formula (I) is 2,2-bis(4-hydroxyphenyl)propane or an alkyleneoxide adduct of 2,2-bis(4-hydroxyphenyl)propane.

5. The electrophotographic photoreceptor belt according to claim 1, wherein said polycarbonate resin is produced by using as a raw material at least one bisphenol selected from the group consisting of 1,1'-biphenyl-4,4'-diol, 2,2-bis(4-hydroxyphenyl)propane, 1,1-bis(4-hydroxyphenyl)cyclohexane and 2,2-bis(4-hydroxy-3-methylphenyl)propane.

6. The electrophotographic photoreceptor belt according to claim 1, wherein the intrinsic viscosity of said polycarbonate resin is 1.0 to 1.6 dl/g.

7. The electrophotographic photoreceptor belt according to claim 1, wherein said photosensitive layer is a multilayer type photosensitive layer separated into a charge generating layer and a charge transport layer.

8. The electrophotographic photoreceptor belt according to claim 7, wherein a binder resin used for said charge transport layer is a polycarbonate resin.

9. The electrophotographic photoreceptor belt according to claim 8, wherein the intrinsic viscosity of said binder resin is 1.0 to 1.6 dl/g.

10. The electrophotographic photoreceptor belt according to claim 8, wherein said binder resin is a polycarbonate resin produced by using as a raw material at least one bisphenol selected from the group consisting of 1,1'-biphenyl-4,4'-diol, 2,2-bis(4-hydroxyphenyl)propane, 1,1-bis(4-hydroxyphenyl)cyclohexane and 2,2-bis(4-hydroxy-3-methylphenyl)propane.

* * * * *